(12) United States Patent
Casebolt et al.

(10) Patent No.: US 8,859,068 B2
(45) Date of Patent: Oct. 14, 2014

(54) ADHESIVE STACK WITH A CENTRAL SHEAR LAYER

(75) Inventors: Matthew P. Casebolt, Fremont, CA (US); Robert Sean Murphy, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 184 days.

(21) Appl. No.: 13/250,786

(22) Filed: Sep. 30, 2011

(65) Prior Publication Data

US 2013/0034727 A1 Feb. 7, 2013
US 2013/0122291 A2 May 16, 2013

Related U.S. Application Data

(63) Continuation-in-part of application No. 13/198,586, filed on Aug. 4, 2011.

(51) Int. Cl.
| | | |
|---|---|---|
| *B32B 9/00* | (2006.01) | |
| *B32B 7/12* | (2006.01) | |
| *B32B 37/20* | (2006.01) | |
| *C09J 7/02* | (2006.01) | |
| *B32B 37/12* | (2006.01) | |

(52) U.S. Cl.
CPC .......... *C09J 7/0296* (2013.01); *B32B 2309/105* (2013.01); *B32B 37/1284* (2013.01); *B32B 37/206* (2013.01); *C09J 2201/128* (2013.01); *C09J 2203/326* (2013.01); *B32B 2405/00* (2013.01); *C09J 2467/006* (2013.01)
USPC .......... 428/40.1; 428/41.8; 428/41.9; 428/43; 428/343; 428/354

(58) Field of Classification Search
CPC .......... B32B 7/06; B32B 7/12; B32B 37/206; B32B 27/322; B32B 27/36; G09F 3/10; G09F 3/0288; G09F 3/0292; G09F 2003/0277; C09J 2203/326; C09J 2203/328; C09J 2203/342; C09J 2467/006; C09J 7/0296
USPC .............. 428/40.1, 41.9, 343, 354, 914, 915, 428/41.6–42.1, 43, 103, 352
See application file for complete search history.

(56) References Cited

U.S. PATENT DOCUMENTS 6,572,945 B2 * 6/2003 Bries et al. .................... 428/40.1
7,635,516 B2 12/2009 Arimitsu et al.
(Continued)

FOREIGN PATENT DOCUMENTS

Wo 2006050863 5/2006
WO 2006097282 9/2009

*Primary Examiner* — Patricia L Nordmeyer
(74) *Attorney, Agent, or Firm* — Kendall P. Woodruff (57) ABSTRACT

An adhesive stack comprises a shear layer positioned between two adhesive layers. The shear layer, comprised of a weak adhesive sub-layer positioned between substrate sub-layers, is designed to fail upon application of a deliberate and appropriate shear force and before the failure of the adhesive layers. The adhesive sub-layer defines a width and/or length less than a width and/or length of another layer or sub-layer of the adhesive stack. The adhesive stack aids in securing components within an electronic device to prevent movement of the component when the device is dropped, hit, or bumped. The adhesive stack may occupy minimal space within the device, and reduce the cost of securing the component within the device's interior. The adhesive stack may allow for replacement of the component by an authorized person applying an appropriate and deliberate force. The adhesive stack may aid in identifying components replaced by an unauthorized person.

18 Claims, 5 Drawing Sheets

(56) References Cited

U.S. PATENT DOCUMENTS

| | | |
|---|---|---|
| 7,811,647 B2 | 10/2010 | Arimitsu et al. |
| 7,910,206 B2 | 3/2011 | Kiuchi et al. |
| 2007/0007229 A1* | 1/2007 | Yousif .......................... 215/232 |
| 2007/0207311 A1 | 9/2007 | Klauck et al. |
| 2009/0029085 A1* | 1/2009 | Harruff ........................ 428/42.2 |
| 2010/0252185 A1 | 10/2010 | Kiuchi et al. |
| 2010/0279491 A1 | 11/2010 | Kiuchi et al. |
| 2011/0126968 A1* | 6/2011 | Determan et al. ............ 156/229 |
| 2011/0250445 A1* | 10/2011 | Alderson et al. .............. 428/343 |
| 2012/0000504 A1* | 1/2012 | Bengtson et al. ............. 136/244 |

* cited by examiner

ADHESIVE STACK WITH A CENTRAL SHEAR LAYER

CROSS REFERENCE TO RELATED APPLICATIONS

This application is a continuation-in-part patent application of U.S. patent application Ser. No. 13/198,586, filed Aug. 4, 2011, and titled "Adhesive Stack Having a Central Shear Layer," the disclosure of which is hereby incorporated herein by reference in its entirety.

TECHNICAL FIELD

The present invention relates generally to electronic devices, and more specifically, to securing components within electronic devices.

BACKGROUND

Electronic devices are assembled from many individual components. Components are generally housed within the interior of the electronic device's shell. Individual components often require both physical and electronic connection to the electronic device and other components. In order to reduce the size of an electronic device, not only are the components minimized but so too are the structures that connect and secure the components within the device. Thus, the structures for securing components should be small as well, while maintaining the ability to prevent unwanted movement. Unwanted movement of a component within the device interior may damage the device, for example by damaging the component or other components, circuitry, or electronic connections within the device. Unwanted movement of an unsecured device may result from accidental bumping, dropping, or striking.

Further, it may often be useful to detect whether or not a component or other secured portion of an electronic device has been changed or altered. For many devices, changing, altering or tampering with internal components may void any warranty associated with the device. In other situations, changes to the internal components of a device may create a hazardous situation. Thus, it may be advantageous to use a securing mechanism that also makes tampering obvious.

What is needed is a structure or device that may secure components within an electronic device, wherein the securing structure or device is low cost, occupies minimal space within the device interior, allows an authorized person to quickly and easily replace the component, and will further indicate whether an unauthorized person has replaced or attempted to replace the component.

SUMMARY

Embodiments discussed herein may be directed to adhesive structures, compositions, methods of making adhesive structures, and/or methods of using adhesive structures for fixedly, securedly, and reworkably positioning an individual, removable component in an electronic device.

As described herein, one embodiment of the adhesive structure may be comprised of three or more layers, with two of the layers being adhesive layers, and a third layer being a shear layer positioned between the two adhesive layers. The first and second adhesive layers are designed to contact a first adherent surface and a second adherent surface, respectively, wherein the first and second adherent surfaces are surfaces of components or other structures within the interior of the electronic device. The shear layer is designed to prevent or reduce contact, and physical and/or chemical bonding between the two adhesive layers. Thus, when an appropriate and deliberate force is applied, the adhesive structure may be broken along the shear layer such that the components or other structures secured by the adhesive stack may be physically and spatially separated. A "deliberate force" is one which is applied by a person in the act of removing or re-positioning a structure secured by the adhesive stack. An "appropriate force" is a force applied and designed to result in the failure of the adhesive stack at the shear layer. The appropriate force may be applied with the aid of wedge-like tools inserted into or near the adhesive stack. In many cases the appropriate force is applied normal to the plane of the adhesive stack.

As described herein, one embodiment of the adhesive structure may be comprised of a shear layer comprising three sub-layers: two substrate layers and an adhesive layer positioned between the substrate layers. In this embodiment the adhesive sub-layer of the shear layer may define an area that is less than the area of the substrate layers, such that a notch structure is defined at or near an edge of the adhesive structure, designed to accept a tool for initiating the failure of the adhesive structure by application of a deliberate force.

In the absence of an appropriate and deliberate force being applied, the adhesive stack may not fail or shear. In various embodiments the shear layer may be comprised of one or more layers. In various embodiments the adhesive stack may further include release layers positioned on the outside of the adhesive stack and in contact with the first and second adhesive layers.

As described herein, certain embodiments may take the form of a method for fixedly, securedly, and reworkably positioning one or more removable components having a first adherent surface within an interior of an electronic device having a second adherent surface. The method for positioning the component generally may include the operations of: positioning an adhesive stack between the first and second adherent surfaces; contacting a first adhesive layer of the adhesive stack with a first adherent surface; contacting a second adhesive layer of the adhesive stack with a second adherent surface; adding pressure to compress the adhesive stack such that the adhesive stack adheres to both adherent surfaces; and allowing the adhesive layers to bond to said surfaces.

As described herein, another embodiment may be a method of making an adhesive stack, comprising dispensing a first adhesive layer from a first dispensing roll; dispensing a second adhesive layer from a second dispensing roll; dispensing a shear layer from a third dispensing roll; and positioning the dispensed shear layer between the first dispensed adhesive layer and the second dispensed adhesive layer; and assembling the adhesive stack between a first and second compressing roll. In various embodiments the assembled adhesive stack may further comprise release layers positioned on the outside of the adhesive stack and in contact with the first and second adhesive layers.

Still another embodiment may take the form of an adhesive stack designed to securely and fixedly connect an internal component of an electronic device. The inventive adhesive structure is designed to allow quick and easy removal and/or replacement of the component, when needed, without causing damage to the component itself or the remaining structure or remaining component to which it is attached. Further, breakage of the adhesive structure during replacement of the component will leave part of the adhesive structure attached

DETAILED DESCRIPTION

Described herein are adhesive stacks having shear layers positioned between two or more adhesive layers for fixedly, securely, and reworkably positioning an individual, removable component within an electronic device. The disclosed adhesive stacks allow a reduction in the space within the electronic device that may be required for securing a component. The disclosed adhesive may also aid in identifying components that may have been removed or replaced by an unauthorized user.

Structures or enclosures for securing components within an electrical device's interior are generally designed to aid in easy removal and replacement of the component. In many cases these enclosures are designed to allow an authorized person (and only an authorized person) to release the securing structure, remove the component, replace it with a new component, then reconnect the securing device. Ideally, this is able to be performed quickly and easily at a retail site. In many cases, the enclosures may be metal or plastic. The enclosures may be secured in place with tab structures, screws, or other mechanical securing devices. These enclosures tend to be bulky and their installation may require particular skill. Further, the enclosures may consume valuable space within the device interior, and the use of screws or tabs requires corresponding structures designed to receive them. The corresponding receiving structures may consume additional space within the electronic device.

In some cases a component may be secured through use of an adhesive. While the use of an adhesive may minimize resources and space needed to secure the component, removal and/or replacement of the component may be impossible. In other cases, removal of a component secured with adhesive may only be accomplished by highly skilled technicians at a non-retail location, for example it may require the owner to ship the device to a central location.

Removing components secured with adhesives may increase in difficulty over time. Many adhesives change adhesion characteristics over time. In some cases this may be referred to as "curing." Over time an adhesive may also change the way it contacts an adherent surface. For example, the adhesive may etch the surface to which it is attached, creating a substrate adhesive and resultant stronger bond. Adhesives may also change their adhesion characteristics due to heat. Thus, a component that was easily replaced when first installed may be difficult to remove (requiring the application of increased amounts of force) over time or where the component is in a warm environment. Increased use of force to remove a component may damage the component being replaced, other components, or the electronic device. In addition, the adhesive may leave a residue on a surface that is difficult to remove. Many adhesives may cure over time due to evaporation of a volatile solvent, light/UV exposure, heat and the like.

The use of adhesives to secure components may aid in helping identify components that have been tampered or removed by an unauthorized person. In many cases, it may be desirable to know whether an unauthorized person has replaced or removed a component, for example when a warranty may be voided by such action. In order to ensure that only authorized persons may replace or remove individual components, a tamper indicator may be used. In some cases the tamper indicator may be a seal or tab that is destroyed upon replacement or removal of a component. In other cases, adhesive residue may remain on adherent surfaces indicating unauthorized removal. Tamper indicators, like the mechanical enclosures, may add to the cost of the device.

Adhesive Stack

The adhesive stack may be formed from three or more layers. Two of the layers may be adhesive layers and the third layer may be a shear layer positioned between the two adhesive layers. Other embodiments may use or have more than three layers. In some embodiments one or both of the adhesive layers may be comprised of two adhesive sub-layers. For example, one adhesive may be is designed to contact the shear layer and the other adhesive layer may be designed to contact an adherent surface. In such embodiments, the adhesive sub-layers may use the same or different adhesives.

The adhesive stack may be positioned between, and in contact with, a first adherent surface on an electronic component and second adherent surface within the electronic device. In some embodiments, the adhesive stack may be positioned between and in contact with adherent surfaces on two components. In various embodiments, the adhesive stack may be positioned between and in contact with an interior wall of a shell of an electronic device and a component. In some embodiments, the adhesive stack may be positioned between and in contact with various surfaces within a component. In other embodiments, the adhesive stack may be positioned between and in contact with structures other than a component. In general, the adhesive stack may be used where an engineered break, or controlled failure, is desired when an appropriate and deliberate force is applied.

A deliberate force is a force applied by a person in the act of, and with the intent of, removing or re-positioning a structure secured by the adhesive stack. Certain examples of forces follow. The deliberate force, or failure force, may be a sum of a retention force and an additional force. The retention force may equal or exceed a force of acceleration experienced by the electronic device during a shock event. Thus, in many embodiments the adhesive stack will not fail during a shock event, such as a fall. Typically, the force required to break or separate the adhesive stack at the shear layer is weaker than the force required to break or separate the stack at the juncture between adhesive and substrate.

An appropriate force is a force applied and designed to result in the failure of the adhesive stack at the shear layer. The failure of the adhesive stack may be a controlled or engineered failure, wherein the adhesive layers remain substantially adhered to the adherent surfaces and the adhesive stack is separated at the shear layer. One example of an appropriate force is a force applied with the aid of a tool, for example a wedge-like tool inserted into or near the adhesive stack. In some embodiments, the wedge-like tool may be inserted between the adherent surfaces, for example a component and an interior wall of an electronic device, where the component is secured to the interior wall by an adhesive stack. In some embodiments the component is designed to accept a tool inserted by an authorized person. In many cases the appropriate force is applied normal to the plane of the adhesive stack. In some embodiments the force required for failure of the shear layer may be determined by, or related to, the mechanical strength of the central shear layer and/or the size or area of the adhesive stack. It should be noted that, the aster the appropriate force is applied, the greater the resistance of the adhesive to the force, and thus the easier it may be to shear the central layer. Thus, the exact values of an appropriate and/or deliberate force may vary with a variety of factors, including the speed with which the force is applied. In the absence of an appropriate and deliberate force being applied, the adhesive stack may not fail or shear, for example where the device is dropped subject to an accidental striking.

Figure 1:
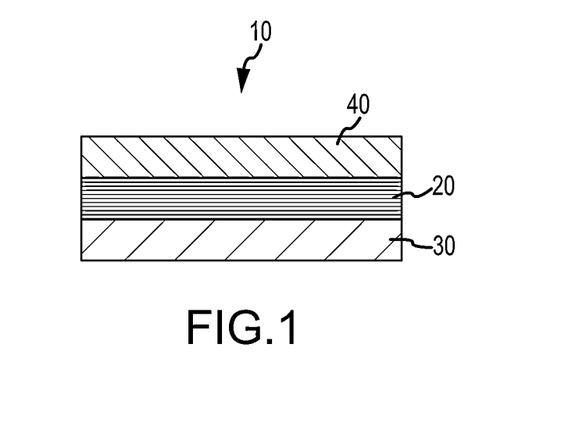
FIG. 1 shows one embodiment of an inventive adhesive stack having three layers; a first adhesive layer, a second adhesive layer, and a shear layer positioned between said first and second adhesive layer.

As depicted in FIG. 1, one embodiment of the presently claimed adhesive stack 10 may be made of three layers 20, 30, 40. Two of the three layers may be adhesive layers 30, 40, and the third layer may be may be a shear layer 20. The shear layer 20 may be positioned between the first adhesive layer 30 and second adhesive layer 40. In some embodiments the adhesive layers may be comprised of the same adhesive compound. In other embodiments the adhesive layers may be formed of different compounds. In some embodiments, the adhesive layers may be made of further adhesive sub-layers.

Figure 2:
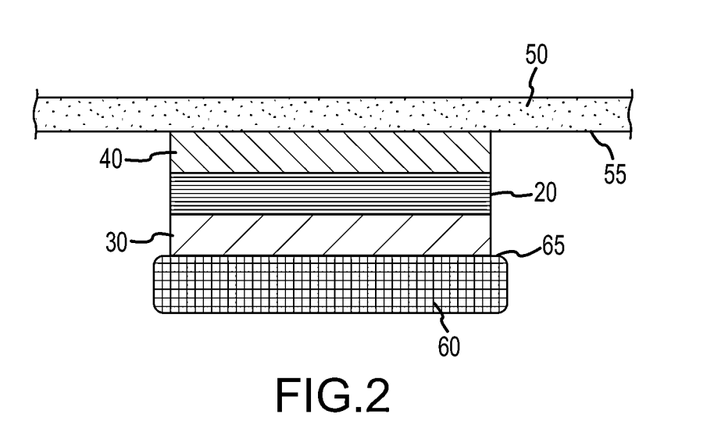
FIG. 2 shows one embodiment of an adhesive stack positioned between a component surface and a second surface.

FIG. 2 depicts the adhesive stack 10 positioned between two adherent surfaces 55, 65. The adherent surfaces may be within an electronic device. In various embodiments, the first adhesive layer 30 may be in contact with a first adherent surface 65, and the second adhesive layer 40 may be in contact with a second adherent surface 55. As one example, the first adherent surface 65 may be a portion of an interior component 60, while the second adherent surface 55 may be an interior surface of a wall of the electronic device 50. In another embodiment, the first adherent surface 65 may be the surface of a component, and the second adherent surface 55 may be the surface of a second component. In some embodiments, the second surface may be the interior surface of the shell of an electronic device.

The adhesive stack may be designed to allow removal of the component when an appropriate and deliberate force is applied. In some cases, this may be referred to as an engineered release. The shear layer is designed to prevent the force required to achieve an engineered release of the adhesive stack from being substantially less than that force required to achieve failure of the shear layer. In many cases the adhesiveness of the adhesive layers of an adhesive stack may change with time or with temperature. In some cases, for example with acrylic adhesives, the adhesive compound of the adhesive layer may etch the adherent surface to which it is in contact, increasing the adhesiveness. Without a shear layer engineered to fail before the adhesive layer, the increased adhesiveness may damage the component or the device when the component is removed.

In various embodiments of the adhesive stack, the shear layer may be formed from one or more sub-layers. In various embodiments the adhesive stack may further include release sub-layers positioned on the outside of the adhesive stack and in contact with the first and second adhesive layers. For example FIG. 4, described below, shows one embodiment of an adhesive stack having release sub-layers positioned on the outside of the adhesive stack. In various embodiments the release layer may be fabric, film, membrane, foil, or a combination thereof. In various embodiments the release layer may be a synthetic or natural material, for example, cloth, metal, vinyl, polypropylene, polyester, plastic, or a combination thereof.

Adhesive Layer

Various adhesive compounds may be used. In some embodiments, the adhesive layer is a pressure sensitive adhesive. A pressure sensitive adhesive may be comprised of various compounds. In some embodiments the pressure sensitive adhesive may be a polymeric or elastomeric compound, for example natural or synthetic rubber. In some embodiments, the polymeric or elastomeric compound may be an acrylic, a vinyl, or styrene-based compound. In various embodiments the pressure sensitive adhesive may include ethylene-vinyl acetate, nitriles, styrene block copolymers, and vinyl ethers. The pressure sensitive adhesive compound may also include other compounds such as tackifiers, some examples of which are resins, plasticizers, and fillers. In some embodiments, a tackifying resin and/or plasticizers may be added in various ratios to change the characteristics of the pressure sensitive adhesive from hard to soft. In various embodiments a tackifying resin may be formed as a brittle solid that may increase initial adhesiveness. In various other embodiments, a plasticizer may be added to the pressure sensitive adhesive to aid in increasing the softness of the pressure sensitive adhesive. A softer pressure sensitive adhesive may be more conformable to differently shaped surfaces. In other embodiments ratios of compounds may be varied to alter the cure rate, or the adhesiveness of a pressure sensitive adhesive.

In some embodiments, the adhesive layer may be other than a pressure sensitive adhesive. For example, in some embodiments a reactive adhesive, contact adhesive, or a hot melt adhesive may be used. In various embodiments, the two sides of the adhesive stack may have different adhesive characteristics and/or may require different a different curing environment. In various embodiments the composition or characteristics of the two sides of the adhesive stack may be chosen based upon the adherent surface contacted by the adhesive.

In various embodiments the adhesive compound used may be an acrylic-based adhesive. The specific adhesive compound may be chosen based upon the adherent surface contacted by the adhesive layer. In various embodiments, the adhesive layers may be formed of the same compound. In other embodiments, the adhesive compounds of the different adhesive layers may be different. In various embodiments the adhesive layers may be comprised of multiple layers of adhesive compound.

Adhesion of the adhesion layer to a surface may be initiated by pressure. In some embodiments the pressure may be applied after the adhesive stack is positioned between the two surfaces to be joined by the adhesive stack. In various embodiments the adhesive stack may be first pressed against a first surface and then pressed against a second surface. For example, the adhesive stack may first be applied to a first component surface, then the component may be positioned within the electronic device with pressure to engage the adhesive stack to the second surface. In various embodiments, the pressure sensitive adhesive may adhere to the adherent surface with the aid of molecular interactions, for example van der Waals interactions. In some embodiments, the bond between the adhesive and the adherent surface may be a chemical bond. In other embodiments, the bond may be solvent-based. Still other embodiments may use an electrical, magnetic or other type of bond. Adhesive or other bonding agents may be dispensed as a liquid or placed as a solid.

In various embodiments, the adhesive layer of the adhesive stack may increase its adhesion, over time, to an adherent surface. In some embodiments this may be referred to as curing. In some embodiments the adhesive stack may increase its adhesion to an adherent surface due to evaporation, time, temperature, light, or other methods, for example wherein a solvent evaporates from the adhesive layer. In some embodiments the adhesive layer may be cured with ultraviolet or infrared light. In certain embodiments the change in adhesiveness may result in, or from, chemical changes in the adhesive layer, such as polymerization. In other embodiments, the physical changes in the adhesive layer may affect adhesiveness with time. The two or more adhesive layers may cure at the same rate or at different rates. In some embodiments the adhesive layers may cure with the same process or different processes. For example, one adhesive layer may cure with evaporation, and the other adhesive layer may cure with temperature.

Shear Layer

The shear layer may be designed to provide a substantially non-porous barrier between the two adhesive layers. In some embodiments, the shear layer may aid in preventing or reducing adjacent adhesive layers bleeding through the shear layer to interact with the other adhesive layer. The shear layer may be designed to shear when a deliberate force is applied or an engineered failure is experienced, and at a different force than the force that may shear one of the adhesive layers. In most embodiments, the force required to shear the shear layer is less than the force required to shear an adhesive layer and/or separate an adhesive layer from an adherent surface.

The shear layer may provide for an adhesive stack wherein the engineered break is within the shear layer. In many embodiments, a thicker shear layer may provide for an engineered break within the shear layer. In other embodiments the engineered break may be at the interface of an adhesive layer and a shear layer. In other embodiments, the engineered break may be at a combination of the adhesive/shear layer interface and within the shear layer.

Creating an engineered break in many embodiments of the adhesive stack may result in two halves of an adhesive stack. For example, one half of the adhesive stack may remain adhered to a first surface and include a first adhesive layer and a first part of the shear layer, and the second half may include a second adhesive layer and a second part of the shear layer adhered to a second adherent surface.

In many embodiments, the force required to shear the shear layer does not substantially change with time, temperature, light exposure, or humidity. In various embodiments the shear layer may be comprised of a compound or material whose physical and chemical characteristics do not significantly change as a result of time or temperature. Thus, the force required to separate the shear layer, or cause it to fail, may not significantly change over time.

The shear layer may be comprised of various substances. In some embodiments the shear layer may be woven or compressed, for example a compressed material such as cotton paper. In some embodiments the shear layer may be a polymer, such as a foam or film. In various embodiments the foam may be comprised of a closed-cell, polyurethane foam. In some embodiments the film may be comprised of polyethylene terephthalate (PET). In other embodiments the shear layer may be a woven material, for example a polymer fabric. In still further embodiments the shear layer may comprise an ink. In various embodiments, the shear layer may be comprised of a non-woven material having a bulk strength less than the adhesive strength. In some embodiments, the shear layer may be a synthetic-type paper.

The shear layer material or materials may be chosen to provide for specific shear characteristics. In some embodiments, the shear layer material may be chosen to allow some wetting of the shear layer material with the adhesive layer. For example a fabric or compressed paper material may absorb some of the adhesive and/or allow some contact between the two adhesive layers. In other embodiments, the adhesive layer may penetrate the shear layer but not contact the opposite shear layer. For example, where the shear layer has a rough or uneven surface the adhesion of the shear layer with the adhesive layer, penetration into the shear layer may be greater than where the shear layer is a smooth surface. In other embodiments, the shear layer material may reduce contact between the two adhesive layers. For example, a foam shear layer material may provide a partial or complete barrier between the two adhesive layers.

In many embodiments, the shear layer may aid in reducing the force necessary to create an engineered break in the adhesive stack. This may be advantageous where the pressure sensitive adhesive compound has increased in adhesiveness over time to the point where it may damage the component because of the increased force that may be needed to break the adhesive alone.

The adhesive stack may act to reduce tampering by unauthorized persons. In many embodiments, the adhesive stack may not be re-assembled after it has been broken. In cases where the adhesive stack has been broken through the actions of a unauthorized person, the adhesive stack must be repaired with an adhesive, which in most embodiments would be readily detectable. In other embodiments, the two halves of the broken adhesive stack may be removed from their respective adherent surfaces, and the adherent surfaces secured with a single adhesive layer, or with an adhesive stack that is readily distinguishable from the original adhesive stack.

In many embodiments the two halves of an adhesive stack that has undergone an engineered brake remain adhered to a first adherent surface, such as a component, and a second adherent surface, such as a second component or interior surface of an electronic device. In many embodiments the two halves of the adhesive stack may be removed from their respective adherent surfaces prior to installation of a replacement component. In many cases the pressure sensitive adhesive is easily removed by peeling the adhesive from the adherent surface to which it is in contact. In other embodiments the pressure sensitive adhesive may be removed by mechanical methods such as scraping, or chemical methods such as exposure to a solvent. In many embodiments wherein the adhesive stack undergoes an engineered break through the shear layer, and a part of the shear layer remains attached to the adhesive layer, the remaining shear layer may aid in removal of the adhesive layer from the adherent surface.

Figure 3:
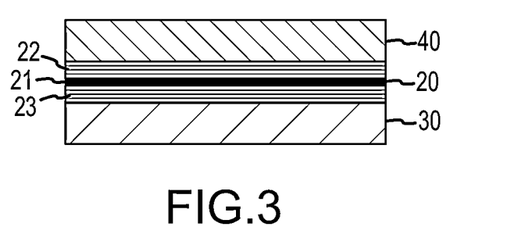
FIG. 3 shows one embodiment of an adhesive stack positioned between two removable protective sheets.

In many embodiments, the shear layer may be a single layer. In some embodiments, the shear layer may be formed of two or more sub-layers. In various embodiments the two or more sub-layers of the shear layer may be made of the same material. In still other embodiments the two or more sub-layers of the shear layer may be of different materials. In some embodiments the shear layer may be comprised of three or more sub-layers. In various embodiments, wherein the shear layer is comprised of three layers, two outer sub-layers of the shear layer may be comprised of a first material and a third sub-layer may be formed of a second material may be positioned between the two sub-layers of the first material. For example, FIG. 3 depicts a shear layer 20 comprised of three sub-layers 21, 22, 23. In some embodiments, such as that shown in FIG. 3, the two outer sub-layers 22, 23 of the shear layer may be of the same or similar materials, while the center sub-layer 21 may be a different material. In some embodiments with three or more sub-layers in the shear layer, the sub-layers may be formed as a first polyethylene terephthalate ("PET") sub-layer, an ink sub-layer, and a second PET sub-layer, in that order. Polyethylenetetraflouride may be used in place of PET.

Figure 4A:
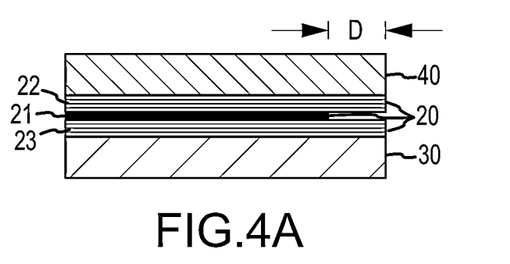
FIG. 4 shows an embodiment of one method of making an adhesive stack.

As shown in FIG. 4A, in various embodiments of adhesive stacks with a shear layer 20 having three sub-layers 21 22 23, the three sub-layers may comprise a central adhesive layer 21 positioned between two substrate layers 22 23. In various embodiments, the substrate sub-layers 22 23 may be made of PET or the like. In various embodiments the adhesive sub-layer 21 may have a weak adhesive strength relative to the adhesive strength of the adhesive layers 30 40. In some embodiments, as described more fully below, the adhesive sub-layer and the substrate sub-layers may define a notch for aiding in achieving an engineered release of the adhesive stack.

The use of an ink layer in the shear layer described above, may aid in allowing engineered break of the adhesive stack to be accomplished with the application of less force than. In some embodiments the ink may be a brittle ink, and the engineered break is within the ink layer and the PET or Polyethylenetetraphthalate layer may remain intact.

In various embodiments, the thickness of the shear layer may be designed to alter the force needed to shear the adhesive layer. For example, in embodiments wherein the shear layer comprises a foam, a thicker foam may provide a cleaner break than a thin foam.

In many embodiments the area defined by the various layers and sub-layers of the adhesive stack are the same, such that a layer or sub-layer positioned between two other layers completely occupies the space between the two outside layers. In some embodiments the area defined by the layers and sub-layers of the adhesive stack may be different.

Figure 4B:
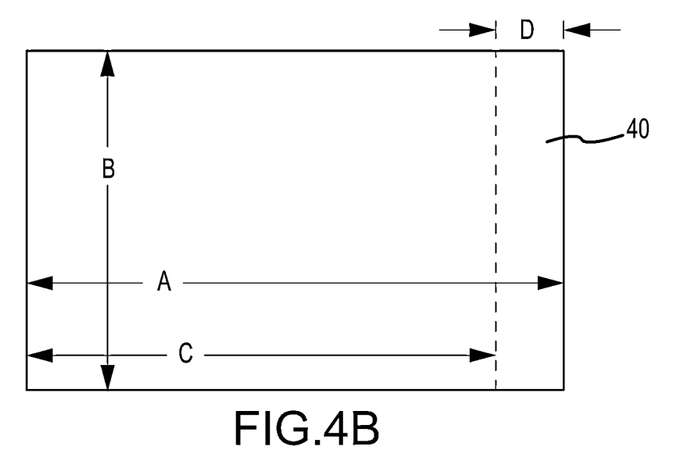
Figure 4C:
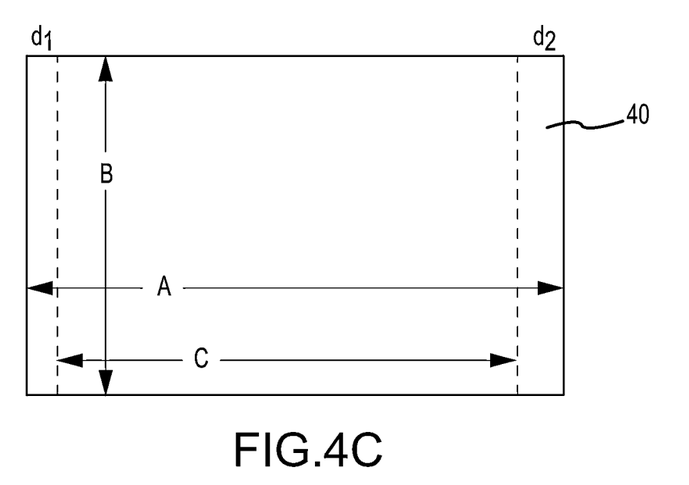

As described above, in various embodiments having a three sub-layer shear layer 20, the adhesive sub-layer and substrate sub-layers may define a notch, for example, as shown in FIGS. 4A, 4B, and 4C. FIG. 4A shows an adhesive sub-layer of a shear layer that does not completely occupy a space between the two adhesive sub-layers of the shear layer. As depicted in FIG. 4A, the adhesive sub-layer 21, is smaller in one dimension than the substrate sub-layers 22 23. For example, the adhesive sub-layer 21 may define a length C that is less than a length A defined by the other layers and sub-layers of the adhesive stack.

A top view of the adhesive stack shown in FIG. 4A shows the adhesive stack defines a length A and a width B, while the adhesive sub-layer also defines a width B but a shorter length C. The length of the adhesive stack A and the length of the adhesive sub-layer C differ by a distance D. Thus, the adhesive stack defines an area A×B that is less than the area defined by the adhesive sub-layer A×C. In the embodiment shown in FIG. 4, the difference D is found at only one end of the adhesive stack. In other embodiments the difference D may be comprised of two smaller differences $d_1 d_2$, which may be positioned at both ends of the adhesive stack as shown in FIG. 4C. In various other embodiments, the widths of the layers and sub-layers of an adhesive stack may also be different. In some embodiments the lengths and widths of various layers and sub-layers of an adhesive stack may differ. In some embodiments the difference in length and/or width may be between about 0.5 and about 1.0 mm. In other embodiments the difference in length or width may be less than about 0.5 mm. In various other embodiments the difference may be greater than 1.0 mm.

In some embodiments of an adhesive stack having layers or sub-layers of different length or width, the difference D or $d_1$ and $d_2$ may define a constructed notch. In some embodiments, the constructed notch of a depth D, $d_1$, or $d_2$ may be designed to accept a tool. The tool may be designed for applying an appropriate and deliberate force and creating an engineered break in the shear layer of the adhesive stack.

Method of Making Adhesive Stack

The adhesive stack may be manufactured using a variety of methods. In some embodiments the adhesive stack may be manufactured by combining the adhesive and shear layer materials stored and dispensed from three separate roller stocks. In various embodiments, where the adhesive stack includes release layers, the adhesive stack may be manufactured by combining two adhesive layers, and a shear layer, wherein the adhesive layers are dispensed from rolls of adhesive layer in contact with a release layer. In various embodiments the release layer may adhere to the adhesive layer with very low adhesion. In various embodiments the release layer may be fabric, film, membrane, foil, or a combination thereof. In various embodiments the release layer may be a synthetic or natural material, for example, cloth, metal, vinyl, polypropylene, polyester, plastic, or a combination thereof.

Figure 5:
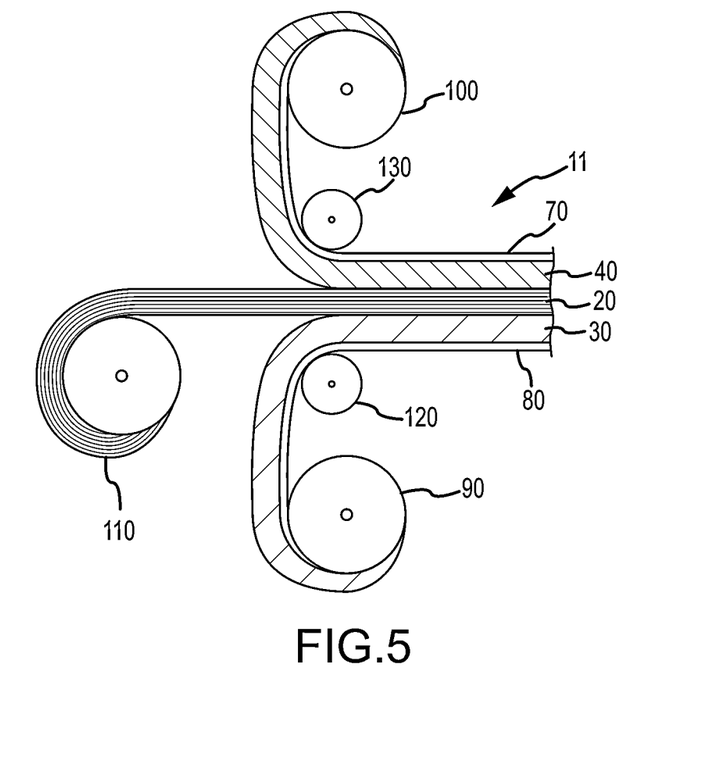
FIG. 5A shows another embodiment of an adhesive stack in side view.
FIG. 5B shows a top view of the embodiment in FIG. 5A.
FIG. 5C shows a top view of another embodiment of the adhesive stack.

FIGS. 5 show one embodiment of a method of manufacturing one embodiment of the presently claimed adhesive stack. The adhesive stack 11 embodiment shown in this figure is comprised a shear layer 20, a first adhesive layer 30, a second adhesive layer 40, a first release layer 70, and a second release layer 80. The first adhesive layer 30 is in contact with the first release layer 70, and positioned between the first release layer 70 and the shear layer 20. The second adhesive layer 40 is in contact with the second release layer 80, and is positioned between and in contact with the shear layer 20 and the second release layer 80. The shear layer 20 is positioned between, and in contact with, the first and second adhesive layers 30 40. Prior to assembly of the adhesive stack 11, the first adhesive layer 30 and first release layer 70 may be positioned on a first dispensing roll 90, the second adhesive layer 40 and the second release layer 80 may be positioned on a second dispensing roll 100, the shear layer may be positioned on a third roll 110. Two rollers 120 130 may be positioned to guide, position, and compress the finished adhesive stack. The assembled adhesive stack 11 may be stored on a roller, or cut and stacked, for example into desired shapes and sizes.

Figure 6:
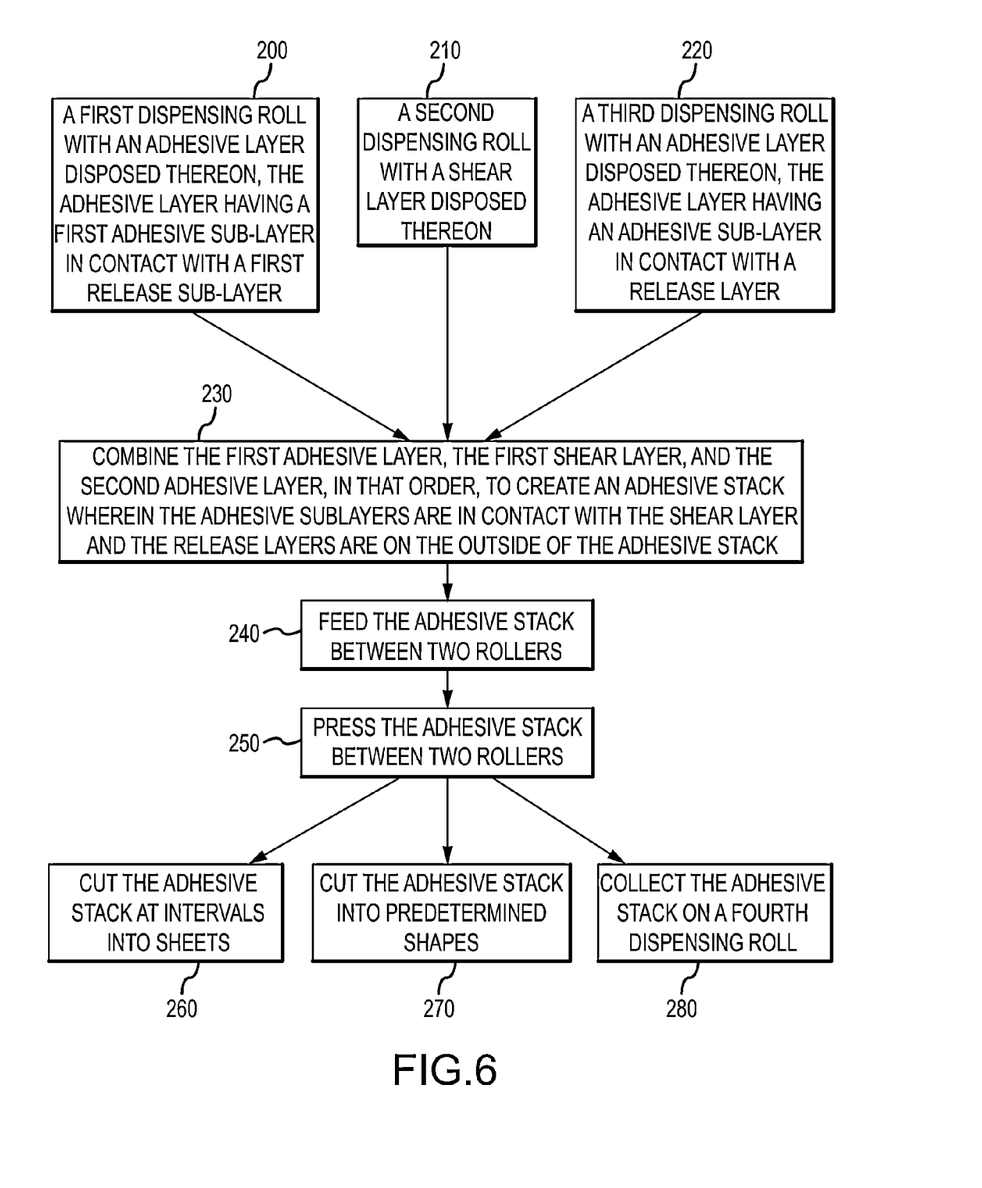
FIG. 6 is a block diagram of a method of making an adhesive stack.

FIG. 6 is a flowchart showing one embodiment of a method for manufacturing an adhesive stack as shown in FIG. 5, for example with the apparatus shown in FIG. 5. The method begins with three dispensing rolls having a first adhesive layer 200, a shear layer 210, and second adhesive layer 220. The adhesive layers and the shear layer are next combined 230 with the shear layer in the middle and release layers on the outside of the adhesive layer. Next the adhesive layer is feed between two rollers 240, and then the adhesive stack is pressed 250. Finally, the adhesive stack may be cut into sheets 260, cut into pre-determined shapes 270, or collected onto a fourth roller 280.

In various embodiments the shear layer may comprise an adhesive sub-layer positioned between two substrate sub-layers as depicted in FIG. 4A. In various embodiments the three-layer shear layer may be manufactured and positioned upon a roller prior to assembly of the adhesive stack as shown in FIGS. 5 and 6. In various embodiments, the adhesive stack comprising a shear layer with three sub-layers may define at least one notch in at least one side of the assembled adhesive stack.

The release layers may protect the adhesive layers of the adhesive stack and allow the adhesive stack to be stored, for example on a dispensing roll. The release layers may also aid in preventing the adhesive stack from adhering to surfaces other than the intended adherent surface. The release layers may also aid in properly positioning a component within the electronic device. For example, when the embodiment of the adhesive stack comprising release layers is ready for use, one release layer may be removed from the adhesive stack and the adhesive stack may be applied to a component surface, then the second release layer may be removed to allow the stack to contact a second surface.

Conclusion

All directional references (e.g., upper, lower, upward, downward, left, right, leftward, rightward, top, bottom, above, below, inner, outer, vertical, horizontal, clockwise, and counterclockwise) are only used for identification purposes to aid the reader's understanding of the example of the invention, and do not create limitations, particularly as to the position, orientation, or use of the invention unless specifically set forth in the claims. Joinder references (e.g., attached, coupled, connected, joined, and the like) are to be construed broadly and may include intermediate members between a connection of elements and relative movement between elements. As such, joinder references do not necessarily infer that two elements are directly connected and in fixed relation to each other.

In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

It will be apparent to those of ordinary skill in the art that variations and alternative embodiments may be made given the foregoing description. Such variations and alternative embodiments are accordingly considered within the scope of the present invention.

We claim:

1. An adhesive stack comprising:
a first adhesive layer;
a second adhesive layer; and
a shear layer positioned between, and in contact with, the first and second adhesive layer, wherein the shear layer comprises an adhesive sub-layer positioned between a first substrate sub-layer and a second substrate sub-layer, wherein the adhesive sub-layer of the shear layer is in contact with both the first and the second substrate sub-layers, wherein the first and the second substrate sub-layers comprise polyethylene terephthalate, wherein the first and second substrate sub-layers layers each comprise a first material, wherein the adhesive sub-layer comprises a second material, and wherein the first material is different from the second material.

2. The adhesive stack of claim 1 wherein the first and second substrate sub-layers have respective first and second surfaces, and wherein the adhesive sub-layer completely covers the first and second surfaces.

3. An adhesive stack comprising:
a first adhesive layer;
a second adhesive layer;
a shear layer positioned between, and in contact with, the first and second adhesive layer; wherein the shear layer comprises an adhesive sub-layer positioned between a first substrate sub-layer and a second substrate sub-layer;
a first release layer in contact with the first adhesive layer; and
a second release layer in contact with the second adhesive layer, wherein the adhesive sub-layer of the shear layer is in contact with both the first and the second substrate sub-layers, wherein the first and second substrate sub-layers have respective first and second surfaces, and wherein the adhesive sub-layer completely covers the first and second surfaces.

4. The adhesive stack of claim 3, wherein the first and the second substrate sub-layers of the shear layer are comprised of polyethylene terephthalate.

5. The adhesive stack of claim 3, wherein the adhesive sub-layer of the shear layer has less adhesive strength than the first or second adhesive layers.

6. The adhesive stack of claim 3, wherein the first and second adhesive layers each comprise a first material, wherein the adhesive sub-layer comprises a second material, and wherein the first material is different from the second material.

7. The adhesive stack of claim 3 wherein an adhesive strength of the first and second adhesive layers is greater than an adhesive strength of the adhesive sub-layer.

8. The adhesive stack of claim 3 wherein the adhesive sub-layer occupies a first region, wherein the first adhesive layer, the second adhesive layer, the first substrate sub-layer, and the second substrate sub-layer each occupy a second region that is greater than the first region, wherein the first adhesive layer contacts the first substrate sub-layer in a first contact region, wherein the first substrate sub-layer contacts the adhesive sub-layer in a second contact region, wherein the adhesive sub-layer contacts the second substrate sub-layer in a third contact region, wherein the second substrate sub-layer contacts the second adhesive layer in a fourth contact region, and wherein the first, second, third, and fourth contact regions vertically overlap each other in a plane that extends from one side of the adhesive stack to an opposing side of the adhesive stack.

9. The adhesive stack of claim 3 wherein the first and second adhesive layers comprise a pressure sensitive adhesive.

10. An adhesive stack comprising:
a first adhesive layer;
a second adhesive layer; and
a shear layer positioned between, and in contact with, the first and second adhesive layer, wherein the shear layer comprises an adhesive sub-layer positioned between a first substrate sub-layer and a second substrate sub-layer, wherein the adhesive sub-layer of the shear layer is in contact with both the first and the second substrate sub-layers, wherein the adhesive sub-layer occupies a first region, and wherein the first adhesive layer, the second adhesive layer, the first substrate sub-layer, and the second substrate sub-layer each occupy a second region that is greater than the first region, wherein the adhesive sub-layer forms a barrier that prevents the first substrate sub-layer from contacting the second substrate sub-layer.

11. The adhesive stack of claim 10, wherein the adhesive sub-layer comprises an adhesive having weaker adhesive strength than the adhesive strength of the first adhesive layer and the second adhesive layer.

12. The adhesive stack of claim 10, further comprising:
a notch formed in a third region between the first and the second substrate sub-layers, wherein the third region does not overlap with the first region.

13. The adhesive stack of claim 12, wherein the notch is configured to accept a tool for applying a deliberate force for creating an engineered break in the adhesive stack.

14. The adhesive stack of claim 12, wherein a length of the adhesive sub-layer of the shear layer differs from a length of each of the first and the second substrate sub-layers of the shear layer by between 0.5 and 1.0 mm.

15. The adhesive stack of claim 12, wherein a length of the adhesive sub-layer of the shear layer differs from a length of each of the first and the second substrate sub-layers of the shear layer by between about 0.0 and 0.5 mm.

16. The adhesive stack of claim 12, wherein a width of the adhesive sub-layer of the shear layer differs from a width of each of the first and the second substrate sub-layers of the shear layer by between 0.5 and 1.0 mm.

17. The adhesive stack of claim 12, wherein a width of the adhesive sub-layer of the shear layer differs from a width of each of the first and the second substrate sub-layers of the shear layer by between about 0.0 and 0.5 mm.

18. The adhesive stack of claim 10 wherein the first and second adhesive layers comprise a pressure sensitive adhesive.

* * * * *